United States Patent [19]
Kim

[11] Patent Number: 5,710,594
[45] Date of Patent: Jan. 20, 1998

[54] DIGITAL GAMMA CORRECTION METHOD AND APPARATUS

[75] Inventor: Ji-ho Kim, Seoul, Rep. of Korea

[73] Assignee: Samsung Electronics Co., Ltd., Kyungki-do, Rep. of Korea

[21] Appl. No.: 511,596

[22] Filed: Aug. 4, 1995

[30] Foreign Application Priority Data

Aug. 6, 1994 [KR] Rep. of Korea .................. 94-19408

[51] Int. Cl.$^6$ .................................................. H04N 5/002
[52] U.S. Cl. ................................................ 348/254; 348/674
[58] Field of Search ........................................ 348/674, 677, 348/254, 255, 675, 676, 721; 358/519; H04N 5/202

[56] References Cited

U.S. PATENT DOCUMENTS 4,862,270  8/1989  Nishio .................................. 348/721
5,089,890  2/1992  Takayama ........................... 348/674

FOREIGN PATENT DOCUMENTS 0070177  3/1990  Japan .......................... H04N 5/202
4170869  6/1992  Japan .......................... H04N 5/202
5153435  6/1993  Japan .......................... H04N 5/202
6197241  7/1994  Japan .......................... H04N 5/202

*Primary Examiner*—Glenton B. Burgess
*Attorney, Agent, or Firm*—Sughrue, Mion, Zinn, Macpeak & Seas, PLLC

[57] ABSTRACT

An apparatus for gamma-correcting image data includes gamma characteristic corrector, a memory, a characteristic selector, and a microprocessor. The characteristic corrector inputs image data values and outputs gamma-corrected image data values corresponding to the image data values according to stored gamma correction information. The memory stores differential data values, and each of the differential data values corresponds to at least one of a plurality of gamma characteristics for gamma correcting the image data values. Furthermore, the differential data values respectively correspond to differences between two values of the gamma-corrected image data values. The characteristic selector outputs a gamma characteristic selection signal which represents a particular gamma characteristic of the plurality of gamma characteristics, and the microprocessor inputs the selection signal and reads particular differential data values from the memory which correspond to the particular gamma characteristic. Then, the microprocessor generates the gamma correction information based on the particular differential data values and stores the gamma correction information in the gamma characteristic corrector. Accordingly, a gamma characteristic of the image signal can be corrected according to various gamma characteristics which are different from each other even though a small capacity of the memory has been used.

23 Claims, 3 Drawing Sheets

DIGITAL GAMMA CORRECTION METHOD AND APPARATUS

FIELD OF THE INVENTION

The present invention relates to a digital gamma correction method and apparatus. More particularly, the present invention relates to a digital gamma correction method and apparatus which are capable of correcting an input image signal according to several different gamma characteristics.

BACKGROUND OF THE INVENTION

A gamma correction operation is utilized to maintain a linear relationship between an optical signal input to a camera and an optical signal output from a receiver. For example, when a receiver processes an image signal according to the NTSC system, the receiver has a gamma factor of 2.2. Thus, a video camera which outputs the image signal to the receiver processes an input optical signal such that the output image signal has a gamma factor of 0.45 with respect to the input optical signal. Since the gamma value of the receiver is corrected by using the gamma value of the video camera, the gamma value of the receiver is selected such that the gamma value of the signal output from the receiver approximately equals "1" (i.e. 2.2×0.45). Accordingly, the optical signal input to the video camera and the image signal output from the receiver maintain a linear relationship.

However, when the manner in which the receiver processes the image signal is varied, the gamma characteristic of the receiver changes. As a result, the gamma characteristic of the video camera must also be adjusted so that the signal input to the video camera and the signal output from the receiver maintain a linear relationship. Accordingly, the video camera or the receiver should ideally have the capability of performing gamma correction on an image signal based on different gamma characteristics in order to be compatible with several types of image signal processing systems.

A conventional apparatus which is capable of correcting the gamma factor of an image signal according to two different gamma characteristics will be described below with reference to FIG. 1. As illustrated in the figure, the conventional gamma correction apparatus 10 comprises a first gamma characteristic corrector 14, a second gamma characteristic corrector 16, and a switch 18. An electrical image signal supplied from an external source is input to the first and second gamma characteristic correctors 14 and 16 via an input terminal 12, and the gamma characteristic correctors 14 and 16 respectively perform gamma correction on the image signal according to stored gamma characteristics. For instance, the gamma characteristic correctors 14 and 16 may respectively store different look-up tables which represent different gamma characteristics. Specifically, the first gamma characteristic corrector 14 may have a linear gamma characteristic, and the second gamma characteristic corrector 16 may have a non-linear gamma characteristic.

After the first and second gamma characteristic correctors 14 and 16 each perform different gamma correction operations on the electrical image signal, the resultant gamma-corrected image signals are output to the switch 18. The switch 18 selectively inputs one of the two gamma corrected image signals based on a control signal from a characteristic determination circuit (not shown), and the selected signal is output as the gamma corrected output signal.

Although the conventional gamma correcting apparatus 10 is capable of performing various different gamma correction operations on an input image signal, the apparatus 10 has several disadvantages. For example, in order to perform many different gamma correction operations, the apparatus 10 must utilize a relatively high number of gamma characteristic correctors. As a result, the amount of hardware components necessary to implement the correctors is high, and manufacturing the apparatus 10 is expensive.

SUMMARY OF THE INVENTION

In order to solve the above problems, it is an object of the present invention to provide a digital gamma correction method for performing a gamma correction operation on a plurality of image signals having different gamma characteristics while utilizing a small amount of hardware. Specifically, the method is performed by storing different gamma characteristics in the form of reference and differential data and reconstructing a particular gamma characteristic needed for a particular gamma correction operation by using the stored data corresponding to the particular gamma characteristic.

A further object of the present invention is to provide a digital gamma correction apparatus capable of performing a gamma correction operation by reconstructing the gamma-corrected image data values by selectively using the stored data values corresponding to the appropriate gamma characteristic.

Another object of the present invention is to provide a digital gamma correction apparatus which has a small amount of hardware and which is capable of performing a gamma correction operation on a plurality of electrical image signal having different gamma characteristics.

To accomplish the above objects of the present invention, there is provided a method for gamma-correcting digital input image data, the method comprising the steps of:

(a) storing differential data values, wherein each of said differential data values correspond to at least one of a plurality of gamma characteristics for gamma correcting image data values to produce gamma-corrected image data values which correspond to said image data values and wherein said differential data values respectively correspond to differences between two values of said gamma-corrected image data values;

(b) selecting a particular gamma characteristic which represents a particular gamma characteristic of said plurality of gamma characteristics;

(c) generating gamma correction information based on particular differential data values, wherein said particular differential data values are selected from said differential data values and correspond to said particular gamma characteristic;

(d) storing said gamma correction information; and (e) inputting said image data value and outputting said gamma-corrected image data values corresponding to said image data values based on said gamma correction information.

To achieve another object of the present invention, there is provided an apparatus for gamma-correcting digital input image data, the apparatus comprising:

a gamma characteristic corrector which inputs image data values and outputs gamma-corrected image data values corresponding to said image data values, wherein said gamma characteristic corrector outputs said gamma-corrected image data values according to stored gamma correction information;

storage means for storing differential data values, wherein each of said differential data values correspond to at least one of a plurality of gamma characteristics for gamma correcting said image data values and wherein said differential data values respectively correspond to differences between two values of said gamma-corrected image data values;

characteristic selection means for outputting a gamma characteristic selection signal which represents a particular gamma characteristic of said plurality of gamma characteristics; and control means for reading particular differential data values from said storage means, wherein said particular differential data values correspond to said particular gamma characteristic and wherein said control means generates said gamma correction information based on said particular differential data values and stores said gamma correction information in said gamma characteristic corrector.

To accomplish yet another object of the present invention, there is provided an apparatus for gamma-correcting digital input image data, the apparatus comprising:

a gamma characteristic corrector which inputs image data values and outputs gamma-corrected image data values corresponding to said image data values, wherein said gamma characteristic corrector outputs said gamma-corrected image data values according to stored gamma correction information;

storage means for storing differential data values wherein said differential data values respectively correspond to differences between two values of said gamma-corrected image data values and wherein said gamma-corrected image data values are determined by a gamma characteristic for gamma correcting said image data values; and control means for reading said differential data values from said storage means for generating said gamma correction information based on said differential data values, and for storing said gamma correction information in said gamma characteristic corrector.

BRIEF DESCRIPTION OF THE DRAWINGS

The preferred embodiments are described with reference to the drawings wherein.

DETAILED DESCRIPTION OF THE PREFERRED EMBODIMENTS

A preferred embodiment of the present invention will be described below in more detail with reference to FIGS. 2 to 3B.

Figure 1:
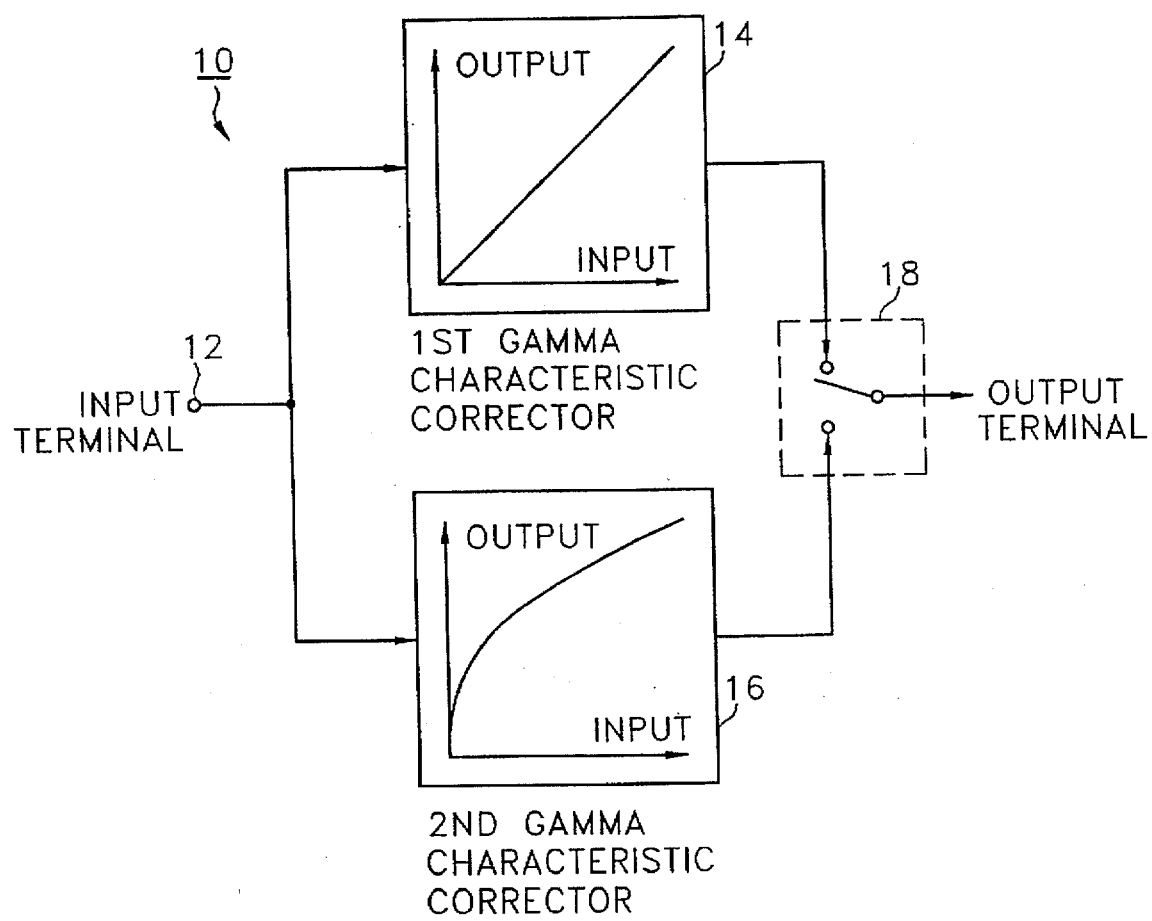
FIG. 1 is a block diagram of a conventional gamma correction apparatus.
Figure 2:
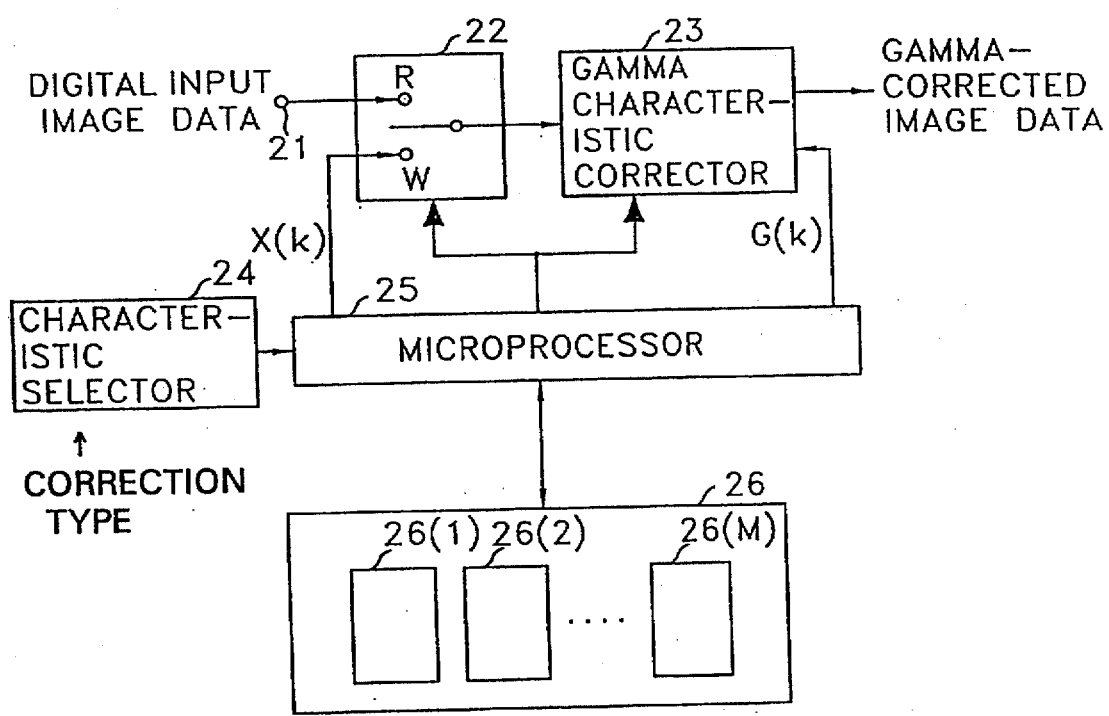
FIG. 2 is a block diagram of a digital gamma correction apparatus according to a preferred embodiment of the present invention.

FIG. 2 is a block diagram of a digital gamma correction apparatus according to a preferred embodiment of the present invention. As illustrated in the figure, the apparatus comprises an input selector 22, a gamma characteristic corrector 23, a characteristic selector 24, a microprocessor 25, and a data storage portion 26.

The input selector 22 inputs image data applied via a signal input terminal 21 and address data X(k) supplied from the microprocessor 25. Furthermore, the selector 22 selectively outputs either the image data or the address data X(k) to the gamma characteristic corrector 23 based on a control signal from the microprocessor 25. If the input selector 22 outputs the image data to the gamma characteristic corrector 23, the corrector 23 performs a gamma correction operation on the image data and outputs the corresponding gamma-corrected image data.

The particular gamma correction operation performed by the corrector 23 is determined by the data stored in the data storage portion 26 and by the manipulation of such data by the microprocessor 25. Specifically, as shown in FIG. 2, the data storage portion 26 comprises M memories 26(1) to 26(M) which store data that correspond to M different gamma characteristics. (M being an integer greater than or equal to 2). More particularly, each of the M memories 26(1) to 26(M) stores a single reference data and a plurality of differential data which correspond to one of the M gamma characteristics.

In order to obtain the data from one of the M memories 26(1) to 26(M) which relates to a desired gamma characteristic, a characteristic selector 24 generates a gamma characteristic select signal based on an external signal which represents the type of gamma correction to be performed by the gamma characteristic corrector 23. Subsequently, the select signal is output to the microprocessor 25, and the microprocessor 25 reads the reference data and the plurality of differential data from the memory 26(1), 26(2), . . . , or 26(M) which corresponds to the gamma characteristic select signal. Afterwards, the microprocessor 25 generates a gamma characteristic table based on such data.

The gamma characteristic table may represent a look-up table that comprises a plurality of input values and a plurality of output values which respectively correspond to the input values. In the illustrative embodiment of the present invention, the input values of the table represent the address data X(k) and the output values of the table represent gamma corrected image data G(k) that respectively correspond to the address data X(k).

When a new gamma characteristic table is to be utilized by the gamma characteristic corrector 23, the microprocessor 25 outputs the address data X(k) contained in the look-up table and controls the input selector 22 such that the selector 22 selectively outputs the data X(k) to the gamma characteristic corrector 23. In addition, the microprocessor 25 outputs the gamma corrected image data G(k) contained in the table to the corrector 23.

A more detailed operation of the apparatus shown in FIG. 2 will be described below. First, when new image data is input to the input terminal 21, the characteristic selector 24 outputs a gamma characteristic select signal to microprocessor 25 based on the type of gamma correction operation to be performed on the image data. Subsequently, the microprocessor 25 controls the input selector 22 so that the selector 22 inputs the address data X(k) supplied from microprocessor 25 and controls gamma characteristic corrector 23 so that the corrector 23 is enabled to store the gamma-corrected image data G(k). While the input selector 22 and the corrector 23 are being controlled, the microprocessor 25 reads the reference data and the differential data from one of the memories 26(1) to 26(M) (e.g. memory 26(1)) which corresponds to the gamma correction operation to be performed on the new image data.

Figure 3A:
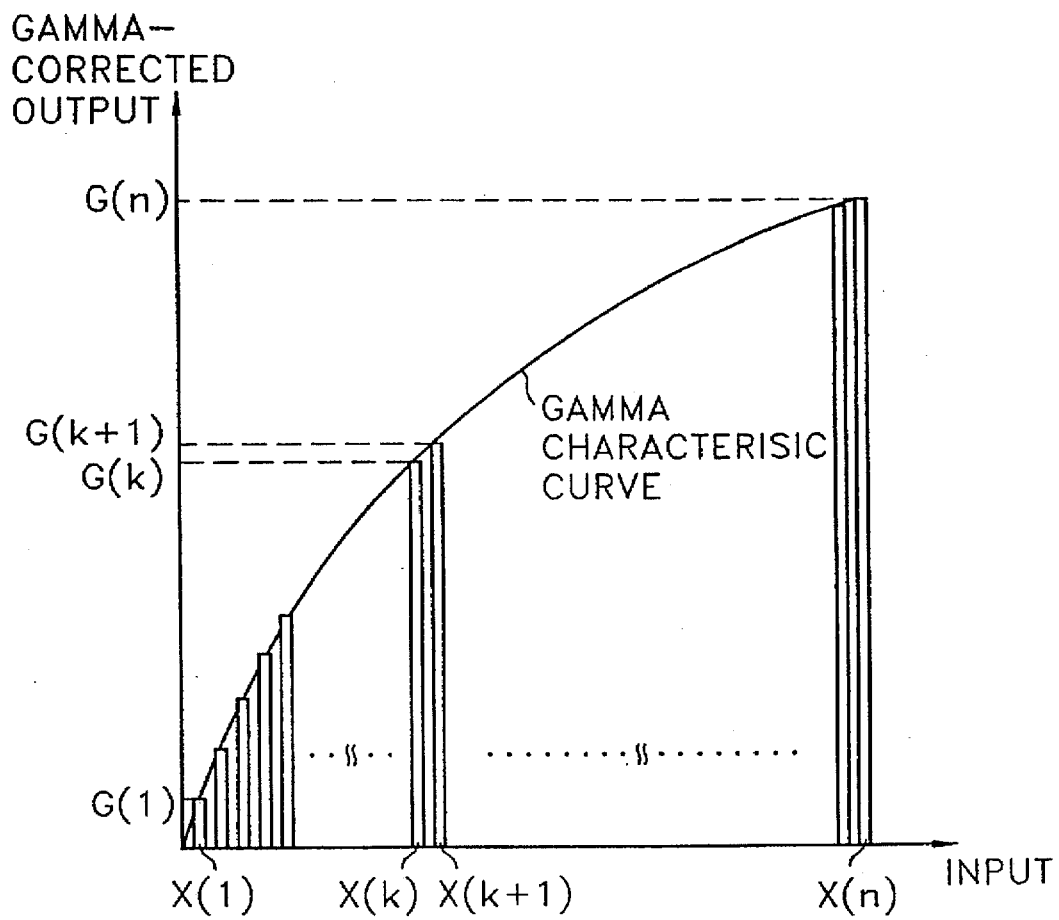
FIG. 3A shows a characteristic curve for obtaining gamma-corrected image data corresponding to input image data.
Figure 3B:
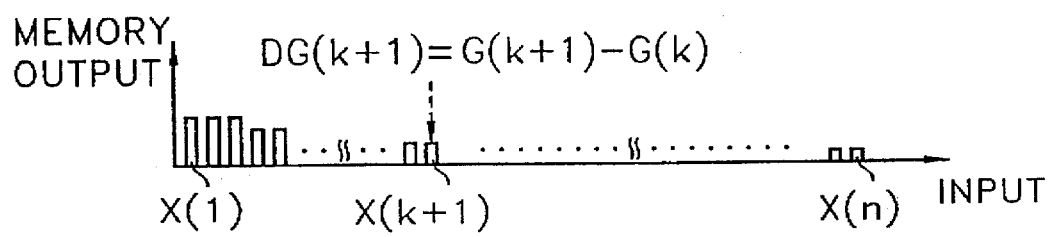
FIG. 3B is a graphical view of a plurality of differential data corresponding to the gamma-corrected image data.

For example, if the gamma correction operation to be performed corresponds to the characteristic curve illustrated in FIG. 3A and the characteristic curve corresponds to the data stored in the memory 26(1), the memory 26(1) contains the reference and image data illustrated in FIG. 3B. In particular, the memory 26(1) contains the gamma-corrected image data G(1) which corresponds to the image data X(1) as the reference data and stores the rest of the gamma-corrected image data G(k) in the form of differential data DG(k). The differential data DG(k) may represent the difference between the gamma corrected image data G(k) corresponding to the image data X(k) and the gamma corrected image data G(k-1) corresponding to the image data X(k-1). In other words, the differential data may satisfy the relationship DG(k)=G(k)-G(k-1). As in the case of the memory 26(1), each of the remaining memories 26(2) to 26(M) stores a single reference data and a plurality of differential data corresponding to the other various gamma correction operations.

After the microprocessor 25 inputs the reference and differential data X(k) and G(k) from the memory 26(1), it uses the data to generate the gamma characteristic table. Specifically, the microprocessor 25 considers the value of the reference data to be the value of the gamma-corrected image data G(1) which corresponds to the address data X(k) having a value equal to "1". Subsequently, the microprocessor 25 calculates gamma-corrected image data G(k) corresponding to the address data X(k) having values which are greater than "1" by using the following equation:

$$G(k) = 0 \quad (k=0)$$
$$G(k) = \sum_{k=1}^{n} DG(k) \quad (k>0)$$

In other words, the k-th gamma-corrected image data G(k) is obtained by accumulatively summing the reference data G(1) through the k-th differential data DG(k). When the gamma-corrected image data corresponding to all possible input image data are calculated, the microprocessor 25 outputs the n gamma-corrected image data G(1) to G(n) together with the n address data X(1) to X(n) data to the gamma characteristic corrector 23. The gamma characteristic corrector 23 stores the address data X(1) to X(n) and the corresponding gamma-corrected image data G(1) to G(n) in the form of the look-up table.

After the look-up table corresponding to the selected gamma characteristic is completely stored in the gamma characteristic corrector 23, the microprocessor 25 enables the corrector 23 so that the corrector 23 can output the gamma-corrected image data corresponding to the input image data. Furthermore, the microprocessor 25 controls the input selector 22 so that the image data applied to the input terminal 21 is output to the gamma characteristic corrector 23. Accordingly, when external image data is input to the gamma characteristic corrector 23 via the input selector 22, the corrector 23 uses the external image data as the address data X(k) for the look-up table and outputs the gamma-corrected image data G(k) corresponding to the external image data.

The particular value of the gamma corrected image data that corresponds to the particular external image data is a matter of design choice which is determined by the magnitude of the image data and which is obvious to one of ordinary skill in the art. Also, in the above-described embodiment, the reference data stored in each of the memories 26(1) to 26(M) is the gamma-corrected image data which corresponds to the image data having a minimum value of all the image data to be gamma-corrected during the corresponding gamma correction operation. However, the value of the reference data is not limited to the specific example illustrated in the preferred embodiment, and the present invention may utilize reference data which has a different value.

In addition, the embodiment above employs a plurality of memories to store the differential data values corresponding to each of gamma characteristics. However, the present invention may also store the differential data corresponding to each of the gamma characteristics in a single memory. Furthermore, the specific embodiment above may be modified such that the data storage portion 26 only stores the differential data corresponding to single gamma characteristic for gamma correcting the external image data.

As described above, the digital gamma correction apparatus of the present invention can store different gamma characteristics by storing reference and differential data which correspond to each gamma characteristic. Accordingly, an image signal can be gamma corrected based on many different gamma characteristics even though only a small amount of memory is used. Thus, the present invention can be easily modified to accommodate the gamma characteristics of image data input from different types of video equipment having a different gamma characteristics.

While only certain embodiments of the invention have been specifically described herein, it will apparent that numerous modifications may be made thereto without departing from the spirit and scope of the invention.

What is claimed is:

1. A digital gamma correction apparatus comprising:
   a gamma characteristic corrector which inputs image data values and outputs gamma-corrected image data values corresponding to said image data values, wherein said gamma characteristic corrector outputs said gamma-corrected image data values according to stored gamma correction information;

storage means for storing differential data values, wherein each of said differential data values correspond to at least one of a plurality of gamma characteristics for gamma correcting said image data values and wherein said differential data values respectively correspond to differences between two values of said gamma-corrected image data values;

characteristic selection means for outputting a gamma characteristic selection signal which represents a particular gamma characteristic of said plurality of gamma characteristics for gamma correcting said image data values; and control means for reading particular differential data values from said storage means, wherein said particular differential data values correspond to said particular gamma characteristic and wherein said control means generates said gamma correction information based on said particular differential data values and stores said gamma correction information in said gamma characteristic corrector, and wherein said gamma correction information comprises said input image data values and said gamma corrected image data values;

wherein said storage means stores reference data values,
   wherein said reference data values respectively equal different values of said gamma-corrected image data values,
   wherein said different values of said gamma-corrected image data values are each determined by a different gamma characteristic of said plurality of gamma characteristics, and wherein said differences between two values of said gamma-corrected image data values are differences between two values of said gamma-corrected image data values which correspond to two adjacent values of said image data values.

2. The digital gamma correction apparatus according to claim 1, wherein said storage means comprises:
a plurality of memories, wherein each of said plurality of memories stores said differential data values which correspond to a different gamma characteristic of said plurality of gamma characteristics.

3. The digital gamma correction apparatus according to claim 1, wherein said storage means comprises a single memory having a plurality of individual storage areas, wherein each of said plurality of individual storage areas stores said differential data values which correspond to a different gamma characteristic of said plurality of gamma characteristics.

4. The digital gamma correction apparatus according to claim 1, wherein said gamma correction information is arranged so that said image data values represent address data and that said gamma-corrected image data values respectively corresponding to said image data values represent output data which correspond to said address data.

5. The digital gamma correction apparatus according to claim 4, wherein said gamma characteristic corrector inputs an input value of said image data values as an address value and outputs an output value of said gamma-corrected image data values which is stored in said gamma characteristic corrector at said address value.

6. The digital gamma correction apparatus according to claim 1, further comprising:
an input selector having an input terminal for inputting external image data and an output terminal for outputting said external image data to said gamma characteristic corrector as said image data values,
wherein said control means controls said input selector so that said external image data is not output to said gamma characteristic corrector as said image data values before said control means stores said gamma correction information in said gamma characteristic corrector, and
wherein said control means controls said input selector so that said external digital image data is output to said gamma characteristic corrector as said image data values when said gamma correction information is stored in said gamma characteristic corrector.

7. A digital gamma correction apparatus comprising:
a gamma characteristic corrector which inputs image data values and outputs gamma-corrected image data values corresponding to said image data values, wherein said gamma characteristic corrector outputs said gamma-corrected image data values according to stored gamma correction information;
storage means for storing differential data values, wherein each of said differential data values correspond to at least one of a plurality of gamma characteristics for gamma correcting said image data values and wherein said differential data values respectively correspond to differences between two values of said gamma-corrected image data values;
characteristic selection means for outputting a gamma characteristic selection signal which represents a particular gamma characteristic of said plurality of gamma characteristics for gamma correcting said image data values; and control means for reading particular differential data values from said storage means, wherein said particular differential data values correspond to said particular gamma characteristic and wherein said control means generates said gamma correction information based on said particular differential data values and stores said gamma correction information in said gamma characteristic corrector, and wherein said gamma correction information comprises said input image data values and said gamma corrected image data values;
wherein said control means comprises:
a microprocessor which calculates said gamma-corrected image data values which respectively correspond to said image data values by accumulatively summing said particular differential data values which have been read from said storage means, and
wherein said microprocessor causes said gamma characteristic corrector to store said gamma correction information which represents said gamma-corrected image data values and which represents a relationship between said image data values and said gamma-corrected image data values.

8. A digital gamma correction method for gamma-correcting digital input image data, the method comprising the steps of:
(a) storing differential data values, wherein each of said differential data values correspond to at least one of a plurality of gamma characteristics for gamma correcting image data values to produce gamma-corrected image data values which correspond to said image data values and wherein said differential data values respectively correspond to differences between two values of said gamma-corrected image data values;
(b) selecting a particular gamma characteristic from said plurality of gamma characteristics for gamma correcting image data values;
(c) generating gamma correction information based on particular differential data values, wherein said particular differential data values are selected from said differential data values and correspond to said particular gamma characteristic and wherein said gamma correction information comprises said input image data values and said gamma-corrected image data values;
(d) storing said gamma correction information; and
(e) inputting said image data value and outputting said gamma-corrected image data values corresponding to said image data values based on said gamma correction information, wherein said step (a) comprises the step of:
(a1) storing reference data values,
wherein said reference data values respectively equal different values of said gamma-corrected image data values,
wherein said different values of said gamma-corrected image data values are each determined by a different gamma characteristic of said plurality of gamma characteristics, and
wherein said differences between two values of said gamma-corrected image data values are differences between two values of said gamma-corrected image data values which correspond to two adjacent values of said image data values.

9. The digital gamma correction method according to claim 8, wherein said step (d) comprises the step of:
(d1) storing said gamma correction information so that said image data values in said gamma correction information represent address data and that said gamma-corrected image data values respectively corresponding to said image data values represent output data which correspond to said address data.

10. The digital gamma correction method according to claim 9, wherein said step (e) comprises the steps of:

(e1) inputting an input value of said image data values as an address value; and (e2) outputting an output value of said gamma-corrected image data values which is stored at said address value.

11. A digital gamma correction method for gamma-correcting digital input image data, the method comprising the steps of:

(a) storing differential data values, wherein each of said differential data values correspond to at least one of a plurality of gamma characteristics for gamma correcting image data values to produce gamma-corrected image data values which correspond to said image data values and wherein said differential data values respectively correspond to differences between two values of said gamma-corrected image data values;

(b) selecting a particular gamma characteristic from said plurality of gamma characteristics for gamma correcting said image data values;

(c) generating gamma correction information based on particular differential data values, wherein said particular differential data values are selected from said differential data values and correspond to said particular gamma characteristic and wherein said gamma correction information comprises said input image data values and said gamma-corrected image data values;

(d) storing said gamma correction information; and (e) inputting said image data value and outputting said gamma-corrected image data values corresponding to said image data values based on said gamma correction information, wherein said step (c) comprises the step of:

(c1) generating said gamma-corrected image data values which respectively correspond to said image data values by accumulatively summing said particular differential data values.

12. A digital gamma correction apparatus comprising:

a gamma characteristic corrector which inputs image data values and outputs gamma-corrected image data values corresponding to said image data values, wherein said gamma characteristic corrector outputs said gamma-corrected image data values according to stored gamma correction information;

storage means for storing differential data values wherein said differential data values respectively correspond to differences between two values of said gamma-corrected image data values and wherein said gamma-corrected image values are determined by a gamma characteristic for gamma correcting said image data values; and control means for reading said differential data values from said storage means for generating said gamma correction information based on said differential data values, and for storing said gamma correction information in said gamma characteristic corrector, wherein said gamma correction information comprises said input image data values and said gamma-corrected image data values, wherein said storage means stores a reference data value, wherein said reference data value equals a certain value of said gamma-corrected image data value determined by said gamma characteristic, and wherein said differences between two values of said gamma-corrected image data values are differences between two values of said gamma-corrected image data values which correspond to two adjacent values of said image data values.

13. The digital gamma correction apparatus according to claim 12, wherein said gamma correction information is arranged so that said image data values represent address data and that said gamma-corrected image data values respectively corresponding to said image data values represent output data which correspond to said address data.

14. The digital gamma correction apparatus according to claim 13, wherein said gamma characteristic corrector inputs an input value of said image data values as an address value and outputs an output value of said gamma-corrected image data values which is stored in said gamma characteristic corrector at said address value.

15. A digital gamma correction apparatus comprising:

a gamma characteristic corrector which inputs image data values and outputs gamma-corrected image data values corresponding to said image data values, wherein said gamma characteristic corrector outputs said gamma-corrected image data values according to stored gamma correction information;

storage means for storing differential data values wherein said differential data values respectively correspond to differences between two values of said gamma-corrected image data values and wherein said gamma-corrected image values are determined by a gamma characteristic for gamma correcting said image data values; and control means for reading said differential data values from said storage means for generating said gamma correction information based on said differential data values, and for storing said gamma correction information in said gamma characteristic corrector, wherein said gamma correction information comprises said input image data values and said gamma-corrected image data values, wherein said control means comprises:

a microprocessor which calculates said gamma-corrected image data values which respectively correspond to said image data values by accumulatively summing said differential data values read from said storage means, and wherein said microprocessor causes said gamma characteristic corrector to store said gamma correction information which represents said gamma-corrected image data values and which represents a relationship between said image data values and said gamma-corrected image data values.

16. An apparatus for gamma-correcting digital input image data, the apparatus comprising:

storage means for storing first differential data values and second differential data values, wherein said first differential data values correspond to first gamma-corrected image data values and said second differential data values correspond to second gamma-corrected image data values, wherein said first and second gamma-corrected image data values respectively correspond to first and second gamma characteristics for gamma correcting said image data values, and wherein said first differential data values respectively correspond to differences between two values of said first gamma-corrected image data values and said second differential data values respectively correspond to differences between two values of said second gamma-corrected image data values;

a gamma characteristic corrector which inputs said image data values and outputs one of said first and second gamma-corrected image data values, wherein said gamma characteristic corrector outputs said one of said first and second gamma-corrected image data values according to stored gamma correction information;

characteristic selection means for outputting a gamma characteristic selection signal which corresponds to one of said first and second gamma characteristics; and control means for reading one of said first and second differential data values from said storage means based on said characteristic selection signal, for generating said gamma correction information based on said one of said first and second differential data values, and for storing said gamma correction information in said gamma characteristic corrector, wherein said gamma characteristic information comprises said image data values and said one of said first and second gamma-corrected image data values.

17. The digital gamma correction apparatus according to claim 16, wherein said storage means comprises:

a first memory for storing said first differential data values; and a second memory for storing said second differential data values.

18. The digital gamma correction apparatus according to claim 16, wherein said storage means comprises:

a single memory having a first individual storage area and a second individual storage area, wherein said first individual storage area stores said first differential data values and said second individual storage area stores said second differential data values.

19. The digital gamma correction apparatus according to claim 16, wherein said storage means stores a first reference data value and a second reference data value, wherein said first reference data value equals a first particular value of said first gamma-corrected image data values, wherein said second reference data value equals a second particular value of said second gamma-corrected image data values, wherein said differences between two values of said first gamma-corrected image data values are differences between two values of said first gamma-corrected image data values which correspond to two adjacent values of said image data values; and wherein said differences between two values of said second gamma-corrected image data values are differences between two values of said second gamma-corrected image data values which correspond to two adjacent values of said image data values.

20. The digital gamma correction apparatus according to claim 16, wherein said control means comprises:

a microprocessor which calculates said one of said first and second gamma-corrected image data values by accumulatively summing said one of said first and second differential data values which has been read from said storage means, and wherein said microprocessor causes said gamma characteristic corrector to store said gamma correction information which represents said one of said first and second gamma-corrected image data values and which represents a relationship between said image data values and said one of said first and second gamma-corrected image data values.

21. The digital gamma correction apparatus according to claim 16, wherein said gamma correction information is arranged so that all of said image data values represent address data and that said one of said first and second gamma-corrected image data values represents output data which correspond to said address data.

22. The digital gamma correction apparatus according to claim 21, wherein said gamma characteristic corrector inputs an input value of said image data values as an address value and outputs an output value of said one of said first and second gamma-corrected image data values and wherein said output value is stored in said gamma characteristic corrector at said address value.

23. The digital gamma correction apparatus according to claim 16, further comprising:

an input selector having an input terminal for inputting external image data and an output terminal for outputting said external image data to said gamma characteristic corrector as said image data values, wherein said control means controls said input selector so that said external image data is not output to said gamma characteristic corrector as said image data values before said control means stores said gamma correction information in said gamma characteristic corrector, and wherein said control means controls said input selector so that said external digital image data is output to said gamma characteristic corrector as said image data values when said gamma correction information is stored in said gamma characteristic corrector.

* * * * *